US011068409B2

(12) United States Patent
Li

(10) Patent No.: US 11,068,409 B2
(45) Date of Patent: *Jul. 20, 2021

(54) METHOD AND SYSTEM FOR USER-SPACE STORAGE I/O STACK WITH USER-SPACE FLASH TRANSLATION LAYER

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,606

(22) Filed: Nov. 15, 2019

(65) Prior Publication Data
US 2020/0081845 A1 Mar. 12, 2020

Related U.S. Application Data

(63) Continuation of application No. 15/891,151, filed on Feb. 7, 2018, now Pat. No. 10,496,548.

(51) Int. Cl.
*G06F 3/06* (2006.01)
*G06F 12/10* (2016.01)

(52) U.S. Cl.
CPC .............. *G06F 12/10* (2013.01); *G06F 3/061* (2013.01); *G06F 3/064* (2013.01); *G06F 3/0659* (2013.01);
(Continued)

(58) Field of Classification Search
CPC .... G06F 3/061; G06F 3/0659; G06F 12/0246; G06F 3/064; G06F 3/0658; G06F 3/0679;
(Continued)

(56) References Cited

U.S. PATENT DOCUMENTS 3,893,071 A 7/1975 Bossen
4,562,494 A 12/1985 Bond
(Continued)

FOREIGN PATENT DOCUMENTS

JP 2003022209 1/2003
JP 2011175422 9/2011
(Continued)

OTHER PUBLICATIONS

C. Wu, D. Wu, H. Chou and C. Cheng, "Rethink the Design of Flash Translation Layers in a Component-Based View," in IEEE Access, vol. 5, pp. 12895-12912, 2017.*
(Continued)

*Primary Examiner* — Pierre Miche Bataille
(74) *Attorney, Agent, or Firm* — Shun Yao; Park, Vaughan, Fleming & Dowler LLP

(57) ABSTRACT

One embodiment facilitates a user-space storage I/O stack. During operation, the system generates, by a file system in the user-space, a logical block address associated with an I/O request which indicates data to be read or written. The system generates, by a flash translation layer module in the user-space, a physical block address corresponding to the logical block address, wherein the flash translation layer module is located between the file system and a block device driver in the user-space. The system estimates a latency associated with executing the I/O request. In response to determining that the estimated latency is greater than or equal to a predetermined threshold, and that the I/O request is a read request, the system reads the requested data from a location other than the physical block address.

20 Claims, 10 Drawing Sheets

(52) U.S. Cl.
CPC .... *G06F 3/0679* (2013.01); *G06F 2212/1041* (2013.01); *G06F 2212/2022* (2013.01); *G06F 2212/657* (2013.01)

(58) Field of Classification Search
CPC ....... G06F 2212/1041; G06F 2212/657; G06F 2212/7205; G06F 2212/7201; G06F 2212/2022; G06F 12/10; G06F 3/06
See application file for complete search history.

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,825,937 B2 | 9/2014 | Atkisson |
| 8,832,688 B2* | 9/2014 | Tang ................... G06F 9/45545 718/1 |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,251,087 B2* | 2/2016 | Nellans ............... G06F 12/1072 |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1* | 3/2017 | Karamcheti .......... G06F 9/5016 |
| 9,588,977 B1 | 3/2017 | Wang |
| 9,607,631 B2 | 3/2017 | Rausch |
| 9,747,202 B1 | 8/2017 | Shaharabany |
| 9,852,076 B1 | 12/2017 | Garg |
| 9,875,053 B2 | 1/2018 | Frid |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,361,722 B2 | 7/2019 | Lee |
| 10,437,670 B1 | 10/2019 | Koltsidas |
| 10,642,522 B2 | 5/2020 | Li |
| 10,649,657 B2 | 5/2020 | Zaidman |
| 10,678,432 B1* | 6/2020 | Dreier ................... G06F 3/067 |
| 10,756,816 B1* | 8/2020 | Dreier ................. H04L 49/357 |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0296411 A1* | 12/2011 | Tang ................... G06F 9/45545 718/1 |
| 2011/0299317 A1 | 12/2011 | Shaeffer |
| 2011/0302353 A1 | 12/2011 | Confalonieri |
| 2012/0039117 A1 | 2/2012 | Webb |
| 2012/0084523 A1 | 4/2012 | Littlefield |
| 2012/0089774 A1 | 4/2012 | Kelkar |

(56) References Cited

U.S. PATENT DOCUMENTS

| | | |
|---|---|---|
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0331207 A1 | 12/2012 | Lassa |
| 2013/0013880 A1 | 1/2013 | Tashiro |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar et al. |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Jung |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0143780 A1 | 5/2018 | Cho |
| 2018/0150640 A1 | 5/2018 | Li |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189182 A1 | 7/2018 | Wang |
| 2018/0212951 A1 | 7/2018 | Goodrum |
| 2018/0226124 A1 | 8/2018 | Perner |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0065085 A1 | 2/2019 | Jean |

(56) References Cited

U.S. PATENT DOCUMENTS

| | | | |
|---|---|---|---|
| 2019/0073262 A1 | 3/2019 | Chen | |
| 2019/0087115 A1 | 3/2019 | Li | |
| 2019/0087328 A1 | 3/2019 | Kanno | |
| 2019/0171532 A1 | 6/2019 | Abadi | |
| 2019/0205206 A1 | 7/2019 | Hornung | |
| 2019/0227927 A1 | 7/2019 | Miao | |
| 2019/0272242 A1 | 9/2019 | Kachare | |
| 2019/0278654 A1 | 9/2019 | Kaynak | |
| 2019/0324903 A1* | 10/2019 | Yoon .................. | G06F 12/0804 |
| 2019/0339998 A1 | 11/2019 | Momchilov | |
| 2019/0377632 A1 | 12/2019 | Oh | |
| 2019/0377821 A1 | 12/2019 | Pleshachkov | |
| 2019/0391748 A1 | 12/2019 | Li | |
| 2020/0004456 A1 | 1/2020 | Williams | |
| 2020/0004674 A1 | 1/2020 | Williams | |
| 2020/0013458 A1 | 1/2020 | Schreck | |
| 2020/0042223 A1 | 2/2020 | Li | |
| 2020/0097189 A1 | 3/2020 | Tao | |
| 2020/0159425 A1 | 5/2020 | Flynn | |
| 2020/0167091 A1 | 5/2020 | Haridas | |
| 2020/0348888 A1 | 11/2020 | Kim | |

FOREIGN PATENT DOCUMENTS

| | | |
|---|---|---|
| WO | 9418634 | 8/1994 |
| WO | 1994018634 | 8/1994 |

OTHER PUBLICATIONS

Po-Liang Wu, Yuan-Hao Chang and T. Kuo, "A file-system-aware FTL design for flash-memory storage systems," 2009 Design, Automation & Test in Europe Conference & Exhibition, Nice, 2009, pp. 393-398.*

S. Choudhuri and T. Givargis, "Performance improvement of block based NAND flash translation layer," 2007 5th IEEE/ACM/IFIP International Conference on Hardware/Software Codesign and System Synthesis (CODES+ISSS), Salzburg, 2007, pp. 257-262.*

A. Zuck, O. Kishon and S. Toledo, "LSDM: Improving the Performance of Mobile Storage with a Log-Structured Address Remapping Device Driver," 2014 Eighth International Conference on Next Generation Mobile Apps, Services and Technologies, Oxford, 2014, pp. 221-228.*

J. Jung and Y. Won, "nvramdisk: A Transactional Block Device Driver for Non-Volatile RAM," in IEEE Transactions on Computers, vol. 65, No. 2, pp. 589-600, Feb. 1, 2016.*

A. Awad, B. Kettering and Y. Solihin, "Non-volatile memory host controller interface performance analysis in high-performance I/O systems," 2015 IEEE International Symposium on Performance Analysis of Systems and Software (ISPASS), Philadelphia, PA, USA, 2015, pp. 145-154, doi: 10.1109/ISPASS.2015.7095793.*

S. Oikawa, "Accelerating storage access by combining block storage with memory storage," 2015 IEEE/ACIS 14th International Conference on Computerand Information Science (ICIS), Las Vegas, NV, USA, 2015, pp. 449-454, doi: 10.1109/ICIS.2015.7166635.* https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< Fast '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Salzburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

* cited by examiner

METHOD AND SYSTEM FOR USER-SPACE STORAGE I/O STACK WITH USER-SPACE FLASH TRANSLATION LAYER

RELATED APPLICATIONS

This application is a continuation of U.S. patent application Ser. No. 15/891,151, U.S. Pub. No. 2019/0243773 A1, titled "Method and System for User-Space Storage I/O Stack with User-Space Flash Translation Layer," by inventor Shu Li, filed 7 Feb. 2018.

BACKGROUND

Field

This disclosure is generally related to the field of data storage. More specifically, this disclosure is related to a method and system for a user-space input/output (I/O) stack with a user-space flash translation layer.

Related Art

The proliferation of the Internet and e-commerce continues to create a vast amount of digital content. Various storage systems and servers have been created to access and store such digital content. A storage system or server can include multiple drives (e.g., a solid state drive (SSD)), and a drive can include non-volatile memory such as NAND flash for persistent storage. Varying designs for SSDs result in different implementations of the local storage I/O stack for NAND flash, including the implementation of the flash translation layer (FTL). The FTL is mainly responsible for mapping logical block addresses (LBAs) to physical block addresses (PBAs). In a conventional device-based FTL device, the FTL is implemented in the hardware (e.g., the SSD) and uses the resources of the SSD controller. In a conventional kernel-based FTL device, the FTL is implemented in the kernel space and uses the resources of the server (e.g., CPU core, memory, etc.). Because an application runs in the user-space, I/O communication from the application through the stack must pass through the kernel space, which can result in a significant context switch expense. Additionally, in an I/O communication with a conventionally implemented FTL, the kernel space context switch may result in a performance bottleneck, especially when compared to the performance of the SSD itself.

One solution is to bypass the kernel space entirely, by implementing the file system and the block device driver in the user-space. The actual writing of the data is divided into two independent stages: first, the user-space file system formats the file into LBAs; and second, the SSD controller maps the LBA to the PBA. However, the application still has no visibility into where the data is stored on the physical media, and when the data is written to the SSD. Thus, the efficiency, performance, and Quality of Service (QoS) of the system can be negatively affected by this solution.

SUMMARY

One embodiment facilitates a user-space storage I/O stack. During operation, the system generates, by a file system in the user-space, a logical block address associated with an I/O request which indicates data to be read or written. The system generates, by a flash translation layer module in the user-space, a physical block address corresponding to the logical block address, wherein the flash translation layer module is located between the file system and a block device driver in the user-space.

In some embodiments, the system estimates a latency associated with executing the I/O request. In response to determining that the estimated latency is greater than or equal to the predetermined threshold: in response to determining that the I/O request is a read request, the system reads the requested data from a location other than the physical block address; and in response to determining that the I/O request is a write request, the system generates, by the flash translation layer module in the user-space, a new physical block address.

In some embodiments, the estimated latency is determined by a latency estimator module, and generating the physical block address causes the latency estimator module to reset the estimated latency.

In some embodiments, in response to determining that the estimated latency is less than the predetermined threshold, the system performs the following operations: in response to determining that the I/O request is a read request, the system reads the requested data from the physical block address and sends the read data to a requesting host; and in response to determining that the I/O request is a write request, the system writes the requested data to the physical block address.

In some embodiments, the system determines the estimated latency by: in response to determining that physical media associated with the physical block address is currently undergoing a program operation and that the program operation is not suspendable, including in the estimated latency a latency associated with completing the program operation; in response to determining that the physical media associated with the physical block address is currently undergoing an erase operation and that the erase operation is not suspendable, including in the estimated latency a latency associated with completing the erase operation; and in response to determining that raw data in a queue is currently undergoing a retry operation, including in the estimated latency a latency associated with completing the retry operation.

In some embodiments, determining the estimated latency is based on a status or condition of physical media associated with the physical block address.

In some embodiments, the system determines whether the estimated latency is greater than or equal to the predetermined threshold by: determining, by an arbitrator module, whether the estimated latency exceeds or is equal to a currently available quota; and in response to determining that the estimated latency does not exceed the currently available quota, the system performs the following operations. The system measures an actual latency associated with completing the I/O request; the system determines actual QoS statistics based on the actual latency; and the system updates the currently available quota by comparing the actual QoS statistics with the predetermined threshold.

In some embodiments, determining that the estimated latency is greater than or equal to the predetermined threshold is in response to determining that the estimated latency exceeds or is equal to the currently available quota.

In some embodiments, in response to determining that the estimated latency does not exceed the currently available quota, the system generates calibrations for subsequent use in determining the estimated latency by comparing the actual latency with the estimated latency, wherein the calibrations are subsequently used by the latency estimator module to determine the estimated latency for another I/O request.

In some embodiments, reading the requested data from a location other than the physical block address is based on a data recovery technique.

BRIEF DESCRIPTION OF THE FIGURES

In the figures, like reference numerals refer to the same figure elements.

DETAILED DESCRIPTION

Figure 1:
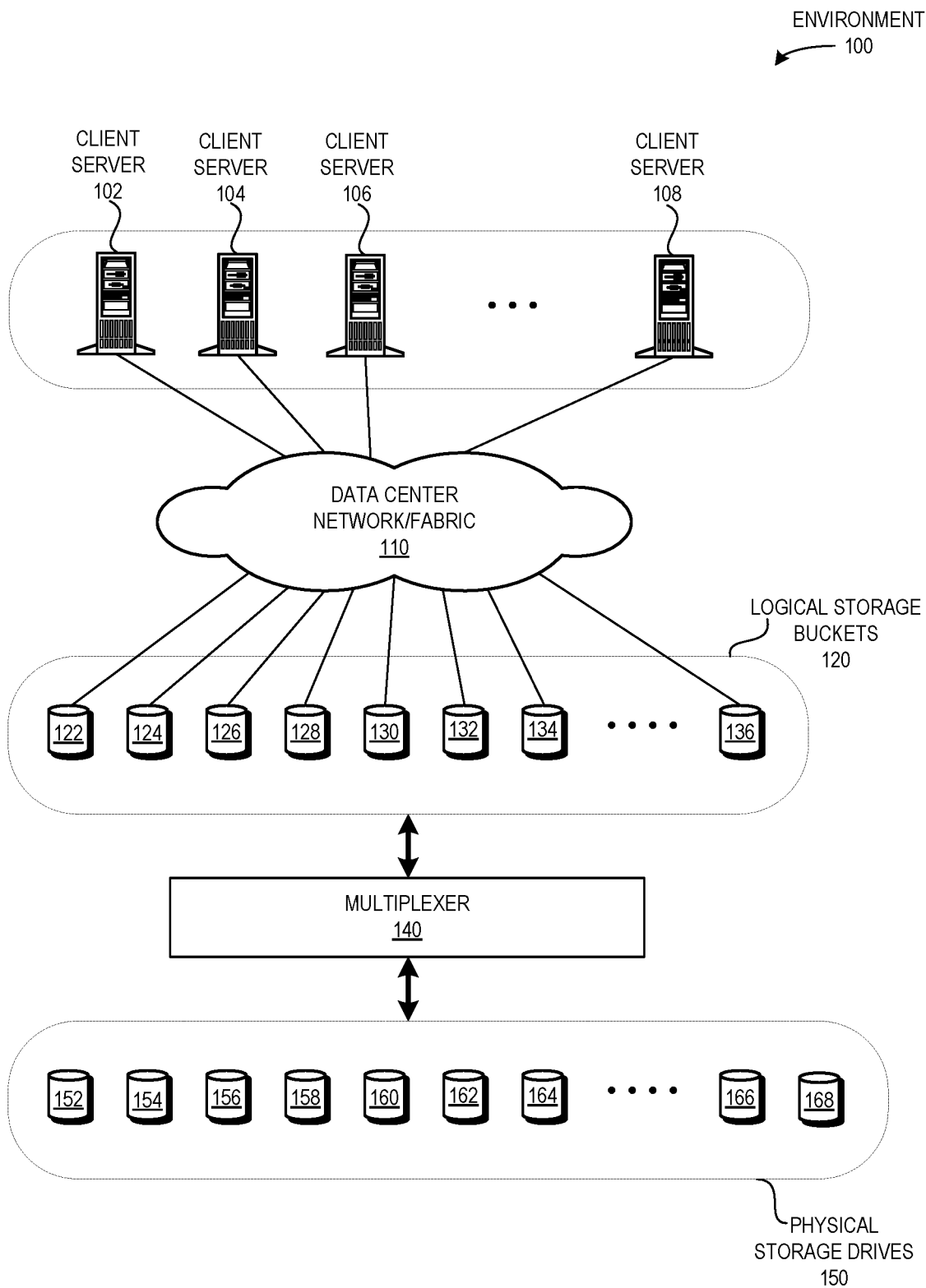
FIG. 1 illustrates an exemplary environment that facilitates a user-space storage I/O stack, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of increasing the efficiency of processing I/O requests by implementing the file system, the flash translation layer (FTL), and the block device driver inside the user-space. In a conventional device-based FTL (where the FTL uses the resources of the SSD controller) and a conventional kernel-based FTL (where the FTL uses the resources of the server), an I/O communication from an application can incur the expense of a context switch in the kernel. The kernel space context switch may result in a performance bottleneck.

One solution is to bypass the kernel space entirely, by implementing the file system and the block device driver in the user-space. The actual writing of the data is divided into two independent stages: first, the user-space file system formats the file into LBAs; and second, the SSD controller maps an LBA to a PBA. However, the application still has no visibility into where the data is stored on the physical media, and when the data is written to the SSD. Thus, in such a system, applications without knowledge of the LBA→PBA mapping cannot perform optimizations to improve the efficiency, performance, and lifespan of the system.

The embodiments described herein solve address these inefficiencies by implementing a system which includes the FTL in the user-space, between the file system and the block device driver, as depicted below in relation to FIG. 4. By including the FTL in the user-space, the system provides the application with visibility into the status, condition, and usage of the physical NAND flash. This visibility allows the application to perform optimizations to increase the overall performance and efficiency of the system.

For example, this visibility allows the system to map an LBA to a PBA which optimizes the current scenario (e.g., based on the current status and historical usage of the NAND physical media). The optimization of mapping or assigning a best-fitting PBA can enhance the ability of the NAND itself to serve the front-end application, which can result in an improved QoS (as described below in relation to FIG. 6). Furthermore, the optimization can reduce both the write amplification and the triggers for garbage collection, which can result in a reduced wear-leveling and an increased lifespan of the NAND physical media.

Thus, the embodiments described herein provide a system which improves the performance and efficiency of a storage system, including an improved QoS, a reduced amount of wear-leveling, and an increased lifespan for the physical media. By implementing the FTL in the user-space between the file system and the block device driver, the system provides an application in the user-space with visibility into and control over the communications involved in processing an I/O request, e.g., within the storage I/O stack.

Exemplary Environment and Network

FIG. 1 illustrates an exemplary environment 100 that facilitates a user-space storage I/O stack, in accordance with an embodiment of the present application. Environment 100 can include client servers 102, 104, 106, and 108, which can each be a client computing device or a computing device which interacts with another client device (such as a tablet, a mobile phone, an electronic reader, a laptop computer, a desktop computer, or any other computing device) and an associated user (not shown)). Servers 102-108 can communicate via a data center network/fabric 110 with logical storage buckets 120 (i.e., buckets 122-136). Logical storage buckets 120 can be a part of a cluster of storage servers (not shown), which can be part of a distributed storage system. A storage server can include multiple storage drives, and each drive can include a controller and multiple physical media for data storage.

Environment 100 can also include a multiplexer 140, which takes as input a specific PBA corresponding to an LBA associated with an I/O request. Multiplexer 140 can send the data to one of physical storage drives 150 (i.e., drives 152-168). By implementing the FTL in the user-space (as described below in relation to FIG. 4), the application (e.g., the host) can have visibility into the current conditions of the physical media (e.g., the physical status of the NAND dies). This allows the user-space file system and the user-space FTL to: 1) determine when to begin background operations, which can prevent scheduling background operations at the same time as ongoing host operations and reduce the need to share the I/O bandwidth of a single SSD; 2) assign an incoming write operation to a drive or a channel with a lower load, which can ensure meeting the service-level agreement (SLA) for the write operation; and 3) analyze the estimated latency for an incoming read operation based on the current conditions, which can determine whether the system retrieves the data from another location or from a given PBA.

Exemplary Environments and Challenges in the Prior Art

Figure 2A:
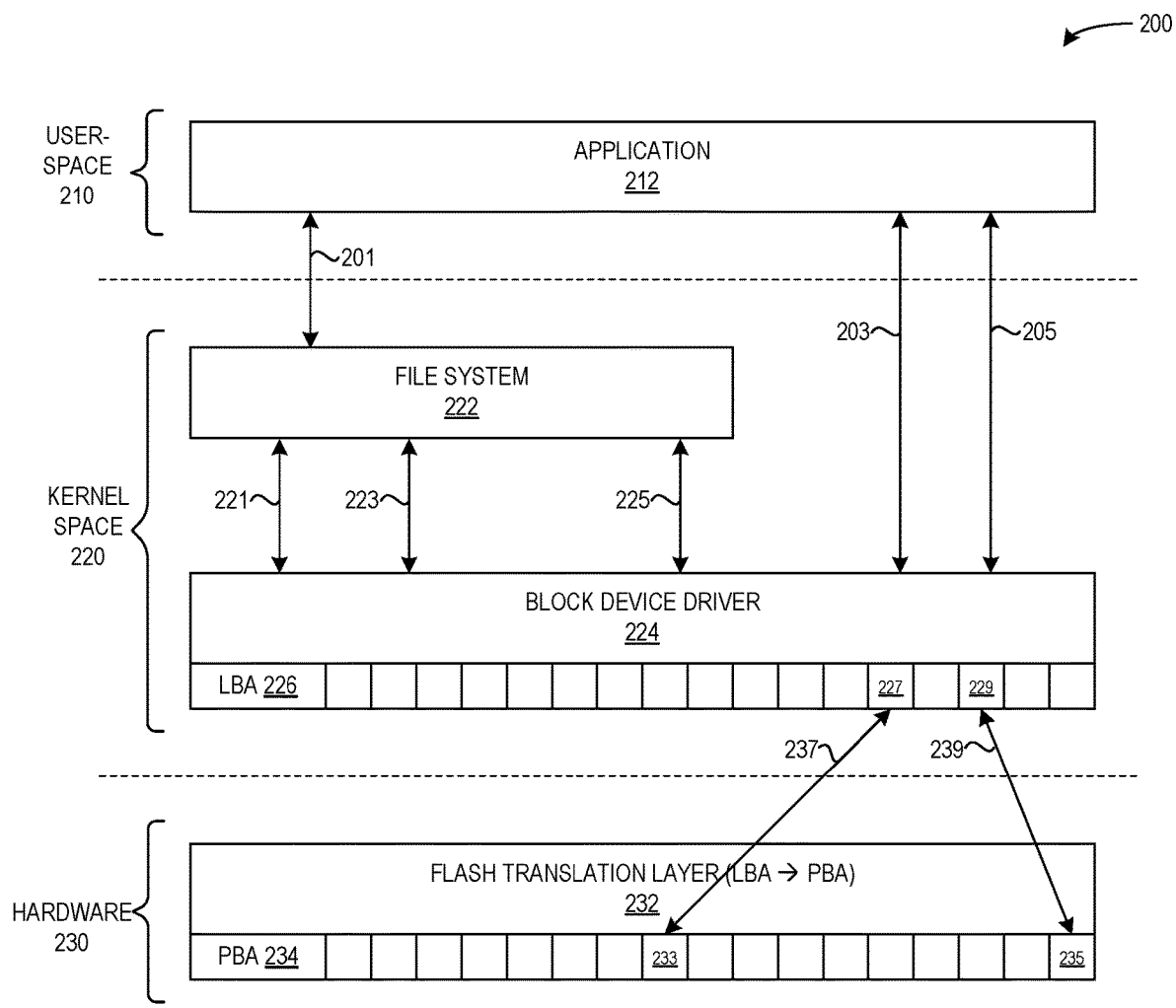
FIG. 2A illustrates an exemplary environment with a device-based FTL implemented inside an SSD, in accordance with the prior art.

FIG. 2A illustrates an exemplary environment 200 with a device-based FTL implemented inside an SSD, in accordance with the prior art. Environment 200 can include a user-space 210, a kernel space 220, and a hardware 230. User-space 210 can include an application 212. Kernel space 220 can include a file system 222 and a block device driver 224, which indicates LBAs, such as LBAs 226, 227, and 229. Hardware 230 can be a Peripheral Component Interconnect Express (PCIe) SSD, which includes an FTL 232 and physical media associated with PBAs, such as PBAs 233, 234, and 235. FTL 232 can perform the LBA→PBA mapping.

During operation, application 212 can communicate with file system 222 (via, e.g., a communication 201) and with block device driver 224 (via, e.g., communications 203 and 205). File system 222 can communicate with block device driver 224 (via, e.g., communications 221, 223, and 225). Block device driver 224 can communicate with FTL 232 to process an I/O request. For example, block device driver 224 can generate LBA 227 which is associated with data indicated in the I/O request. Block device driver 224 can send LBA 227 to FTL 232 (via a communication 237). FTL 232 can map LBA 227 to PBA 233, and write the data associated with LBA 227 to the physical media associated with PBA 233. Similarly, block device driver 224 can generate LBA 229, and send LBA 229 to FTL 232 (via a communication 239). FTL 232 can map LBA 229 to PBA 235, and write the data associated with LBA 229 to the physical media associated with PBA 235.

Figure 2B:
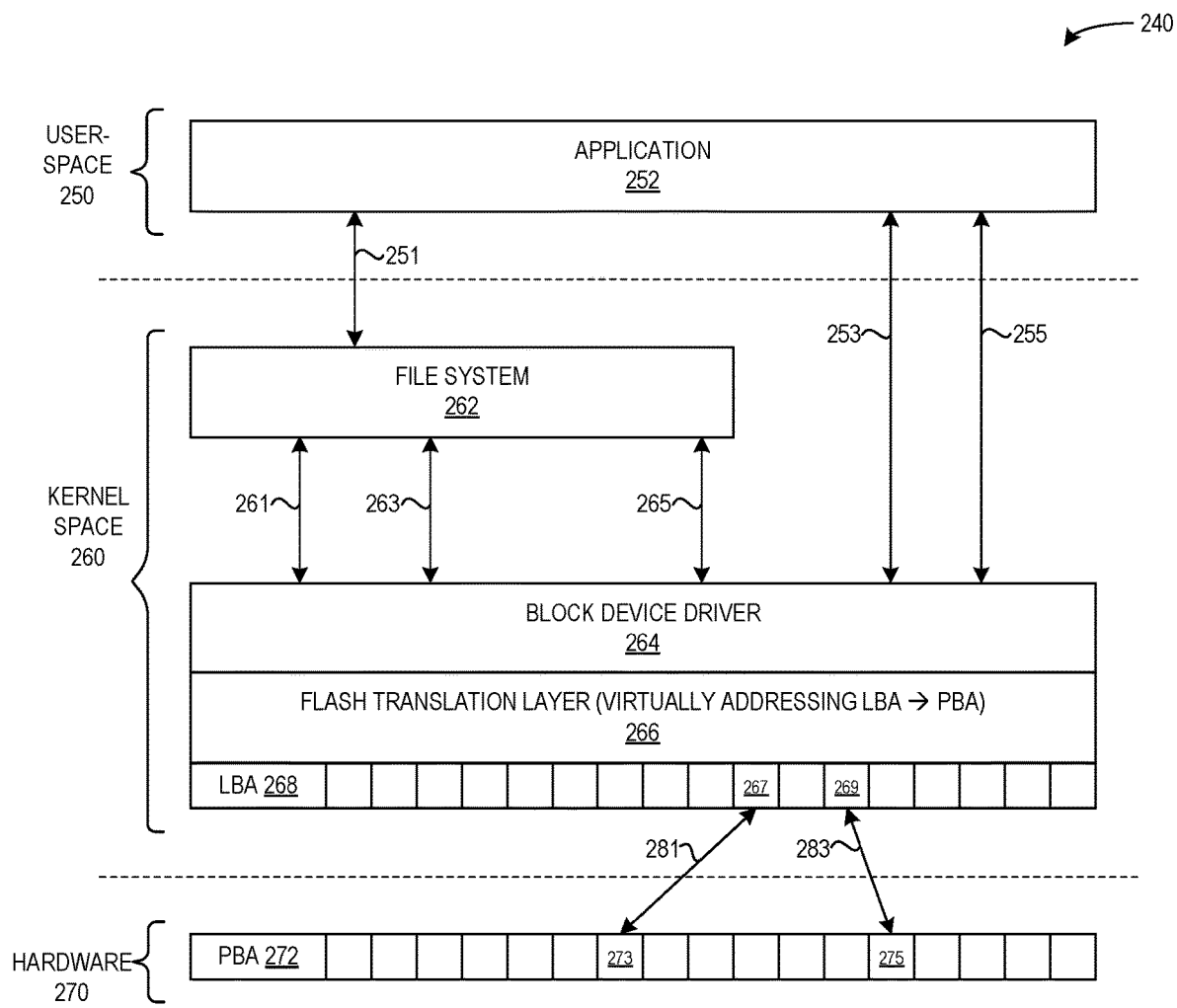
FIG. 2B illustrates an exemplary environment with a kernel-based FTL implemented inside the kernel space, in accordance with the prior art.

FIG. 2B illustrates an exemplary environment 240 with a kernel-based FTL implemented inside the kernel space, in accordance with the prior art. Environment 240 can include a user-space 250, a kernel space 260, and a hardware 270. User-space 250 can include an application 252. Kernel space 260 can include a file system 262, a block device driver 264, and an FTL 266, which performs the LBA→PBA mapping. Block device driver 264 and FTL 266 can indicate LBAs, such as LBAs 267, 268, and 269. Hardware 270 can be a PCIe SSD, which includes physical media associated with PBAs, such as PBAs 272, 273, and 275.

During operation, application 252 can communicate with file system 262 (via, e.g., a communication 251) and with block device driver 264 and FTL 266 (via, e.g., communications 253 and 255). File system 262 can communicate with block device driver 264 and FTL 266 (via, e.g., communications 261, 263, and 265). Block device driver 264 and FTL 266 can communicate with hardware 270 to process an incoming I/O request. For example, block device driver 224 and FTL 266 can map LBA 267 to PBA 273, and write the data associated with LBA 267 to the physical media associated with PBA 273 (via a communication 281). Similarly, block device driver 264 and FTL 266 can map LBA 269 to PBA 275, and write the data associated with LBA 269 to the physical media associated with PBA 275 (via a communication 283).

Thus, to perform the LBA→PBA mapping, the device-based FTL PCIe SSD (as depicted in FIG. 2A) uses the resources of the SSD controller, while the kernel-based FTL PCIe SSD (as depicted in FIG. 2B) uses the resources of the server (e.g., CPU core and memory). In both of these cases, because the application runs in the user-space, communications (e.g., I/O requests) must pass through the kernel space, which can result in a significant context switch expense. Additionally, in an I/O communication with a conventionally implemented FTL as in FIGS. 2A and 2B, the kernel space context switch may result in a performance bottleneck, especially when compared to the performance of the SSD itself.

Figure 3:
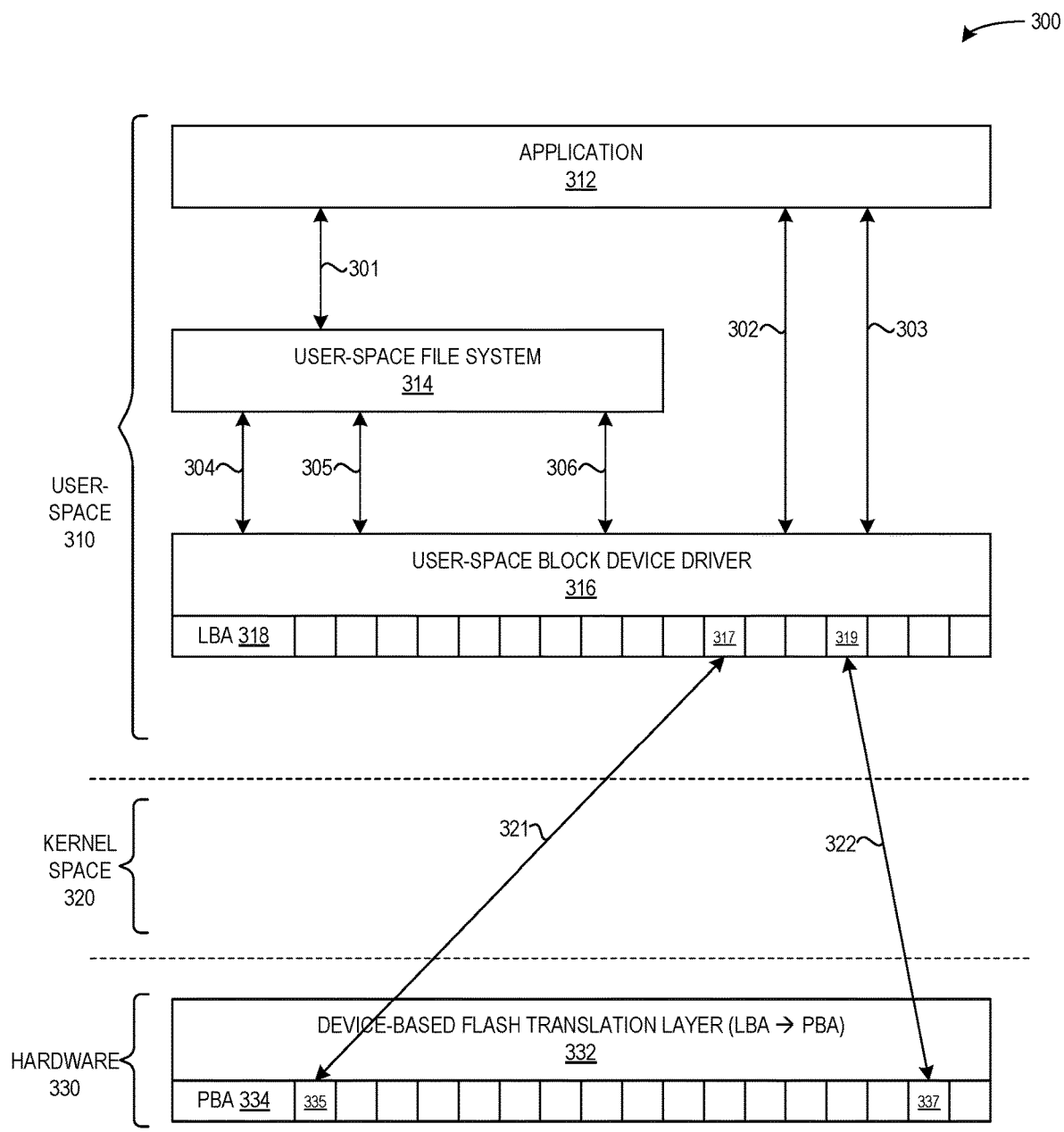
FIG. 3 illustrates an exemplary environment with a device-based FTL implemented inside an SSD, including the file system and the block device driver operating in the user-space, in accordance with the prior art.

FIG. 3 illustrates an exemplary environment 300 with a device-based FTL implemented inside an SSD, including the file system and the block device driver operating in the user-space, in accordance with the prior art. Environment 300 can include a user-space 310, a kernel space 320, and a hardware 330. User-space 310 can include an application 312, a user-space file system 314, and a user-space block device driver 316, which indicates LBAs, such as LBAs 317, 318, and 319. Hardware 330 can include a device-based FTL 332, which performs the LBA→PBA mapping, and can include physical media associated with PBAs, such as PBAs 334, 335, and 337.

During operation, application 312 can communicate with file system 314 (via, e.g., a communication 301) and with user-space block device driver 316 (via, e.g., communications 302 and 303). User-space file system 314 can communicate with user-space block device driver 316 (via, e.g., communications 304, 305, and 306). User-space block device driver 316 can communicate with FTL 232 to process an incoming I/O request. For example, user-space block device driver 316 can generate LBA 317 which is associated with data indicated in the I/O request. User-space block device driver 316 can send LBA 317 to FTL 332 (via a communication 321). FTL 332 can map LBA 317 to PBA 335, and write the data associated with LBA 317 to the physical media associated with PBA 335. Similarly, user-space block device driver 316 can generate LBA 319, and send LBA 319 to FTL 332 (via a communication 322). FTL 332 can map LBA 319 to PBA 337, and write the data associated with LBA 319 to the physical media associated with PBA 337.

Thus, by implementing both the file system and the block device driver in the user-space, the system in FIG. 3 can bypass the kernel space, which may result in a reduced cost for context switching. However, as described above, the actual writing of the data is divided into two independent processes: first, user-space file system 314 formats the file and associated metadata into LBAs using, e.g., the server's CPU core; and second, a microprocessor in the SSD controller (i.e., via FTL 332 of hardware 330) maps the LBAs to the PBAs. As a result, application 312 still has no visibility into where the data is stored on the physical media (i.e., which PBAs of hardware 330), and when the data is written to the physical media. Because these two processes are independent and not visible to the application, the system may not be able to optimize the scheduling and processing of background operations (e.g., garbage collection, logging, and system monitoring) with host operations (e.g., an I/O request that includes these two independent processes). Thus, while bypassing the kernel can provide certain benefits, the system depicted in FIG. 3 cannot perform certain optimizations to improve the efficiency, performance, and lifespan of the system.

Exemplary Environment for Facilitating a User-Space Storage I/O Stack

Figure 4:
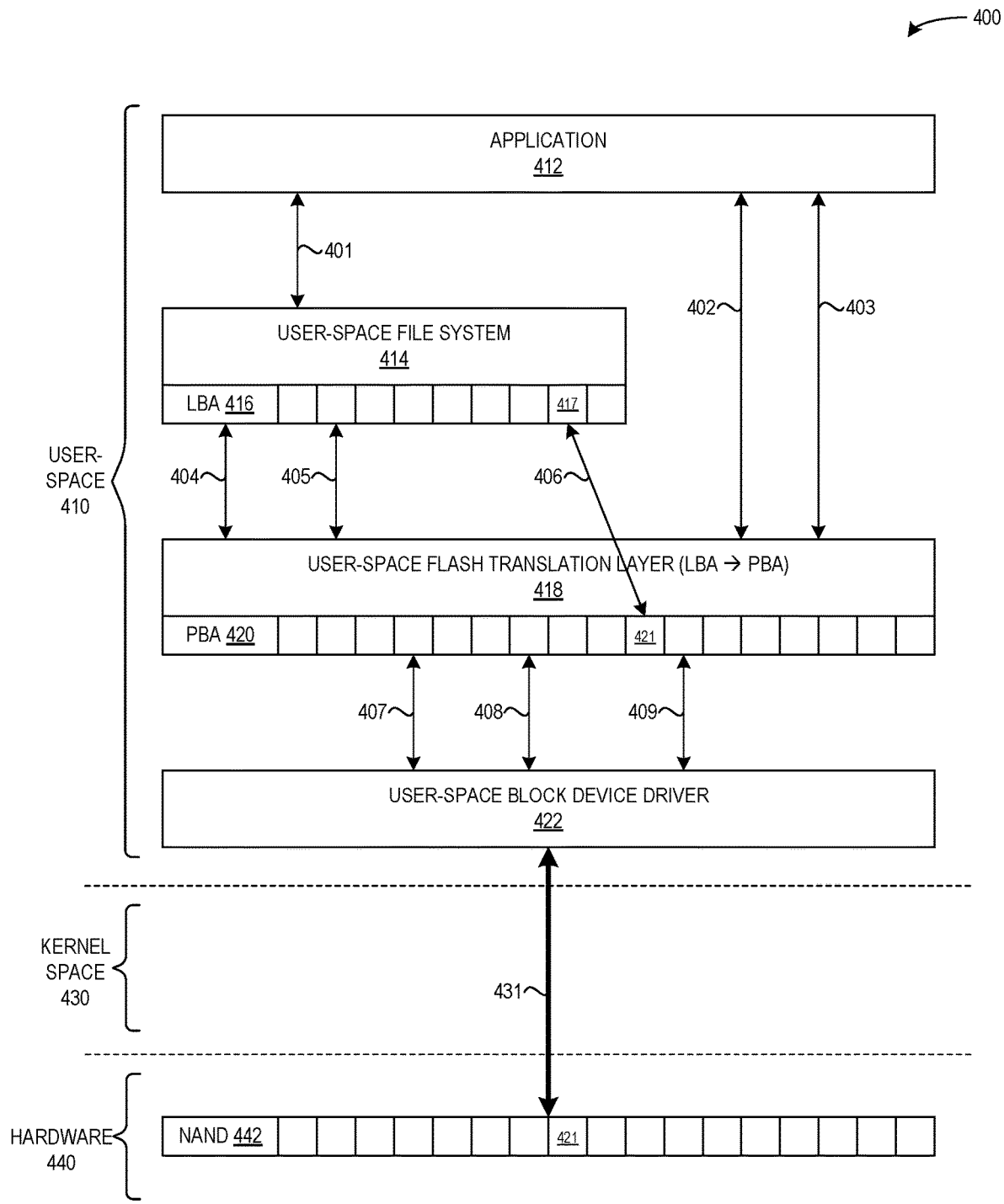
FIG. 4 illustrates an exemplary environment that facilitates a user-space storage I/O stack, including the file system, FTL, and block device driver implemented inside the user-space, in accordance with an embodiment of the present application.

FIG. 4 illustrates an exemplary environment 400 that facilitates a user-space storage I/O stack, including the file system, FTL, and block device driver implemented inside the user-space, in accordance with an embodiment of the present application. Environment 400 can include a user-space 410, a kernel space 430, and a hardware 440. User-space 410 can include an application 412, a user-space file system 414, a user-space FTL 418, and a user-space block device driver 422. User-space file system 414 can generate LBAs for data associated with an I/O request, and can indicate LBAs, such as LBAs 416 and 417. User-space FTL 418 can perform the LBA→PBA mapping, and can indicate PBAs, such as PBA 420 and 421. User-space block device driver 422 can use a mapped PBA directly for data placement into the physical media associated with the mapped PBA of NAND 442.

During operation, application 412 can communicate with user-space file system 414 (via, e.g., a communication 401) and with user-space FTL 418 (via, e.g., communications 402 and 403). User-space file system 414 can communicate with user-space FTL 418 (via, e.g., communications 404 and 405). User-space FTL 418 can communicate with user-space block device driver 422 (via, e.g., communications 407, 408, and 409) to process an incoming I/O request. For example, user-space file system 414 can generate LBA 417 which is associated with data indicated in the I/O request. User-space file system 414 can send LBA 417 to user-space FTL 418 (via a communication 406). User-space FTL 418 can map LBA 417 to, e.g., PBA 421, and notify user-space block device driver 422 of the mapped PBA 421 (via, e.g., one of communications 407, 408, and 409). User-space block device driver 422 can thus operate the mapped PBA 421 to directly place the data associated with LBA 417 to the physical media associated with PBA 421 (e.g., via a communication 431, which bypasses kernel space 430).

Note that an SSD can carry out both the host operations (e.g., read, write, and erase operations) and the background operations (e.g., data refreshing, garbage collection, and bad block management). In a conventional system, the FTL issues or initiates the background operations. As a result, in the conventional system, host operations and background operations which occur simultaneously may share the I/O bandwidth of one physical SSD, which can decrease the overall performance of the system.

The embodiments described herein solve this problem by placing the FTL in the user-space between the user-space file system and the user-space block device driver. This provides the host with visibility into the current status and historical usage of the PBA, which allows the user-space FTL to optimize the LBA→PBA mapping.

The user-space FTL can also optimize the scheduling of the background operations. On an incoming write operation, the system can determine that a certain drive or channel is busy, and subsequently assign the write operation to a drive or a channel with a lower load. This can ensure that the write operation meets the required SLA (e.g., does not exceed a predetermined threshold or a currently available quote). On an incoming read operation, the user-space FTL can analyze the estimated latency for the incoming read operation based on the "big picture" (e.g., the status or condition of the physical media). Based on the estimated latency, the user-space FTL can either determine to retrieve the requested data to be read from a different location or determine to read the data from the given PBA. Processing an incoming I/O request is described below in relation to FIG. 5A, and estimating a latency associated with an I/O request is described below in relation to FIG. 5B.

Method for Facilitating a User-Space Storage I/O Stack

Figure 5A:
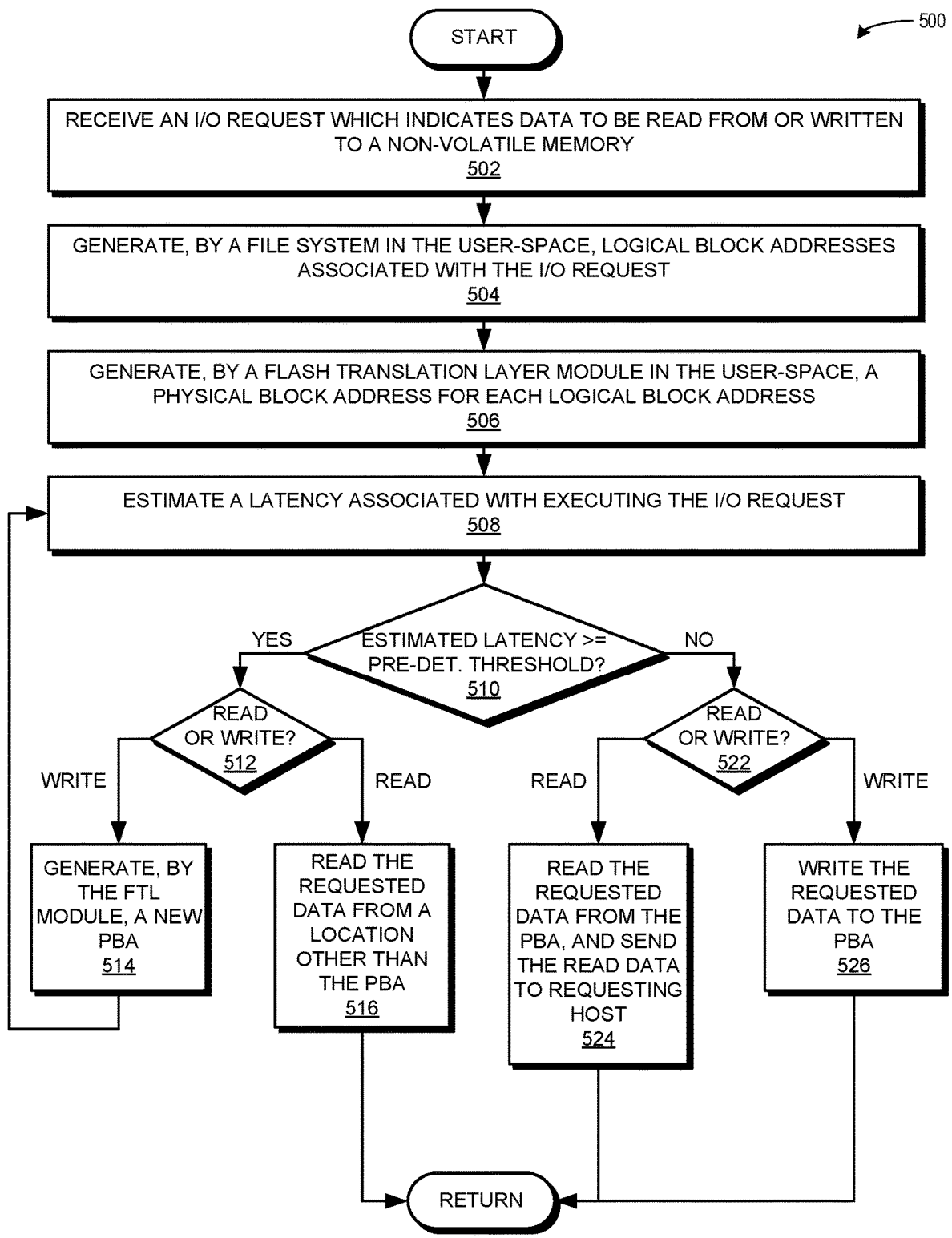
FIG. 5A presents a flowchart illustrating a method for facilitating a user-space storage I/O stack, in accordance with an embodiment of the present application.

FIG. 5A presents a flowchart 500 illustrating a method for facilitating a user-space storage I/O stack, in accordance with an embodiment of the present application. During operation, the system receives an I/O request which indicates data to be read from or written to a non-volatile memory (operation 502). The system generates, by a file system in the user-space, logical block addresses associated with the I/O request (operation 504). The system generates, by a flash translation layer module in the user-space, a physical block address for each logical block address (operation 506). The flash translation layer module is located between the file system and a block device driver in the user-space, as described above in relation to FIG. 4. The system estimates a latency associated with executing the I/O request (operation 508). The system determines whether the estimated latency is greater than or equal to a predetermined threshold (decision 510). If the estimated latency is greater than or equal to the predetermined threshold (decision 510), and if the operation is a write operation (decision 512), the system generates, by the FTL module, a new physical block address for a respective LBA (operation 514), and the operation continues as described above at operation 508. If the estimated latency is greater than or equal to the predetermined threshold (decision 510), and the operation is a read operation (decision 512), the system reads the requested data from a location other than the physical block address (operation 516).

If the estimated latency is less than the predetermined threshold (decision 510), and if the operation is a read operation (decision 522), the system reads the requested data from the PBA, and sends the read data to a requesting host (operation 524). If the estimated latency is less than the predetermined threshold (decision 510), and if the operation is a write operation (decision 522), the system writes the requested data to the PBA (operation 526).

Figure 5B:
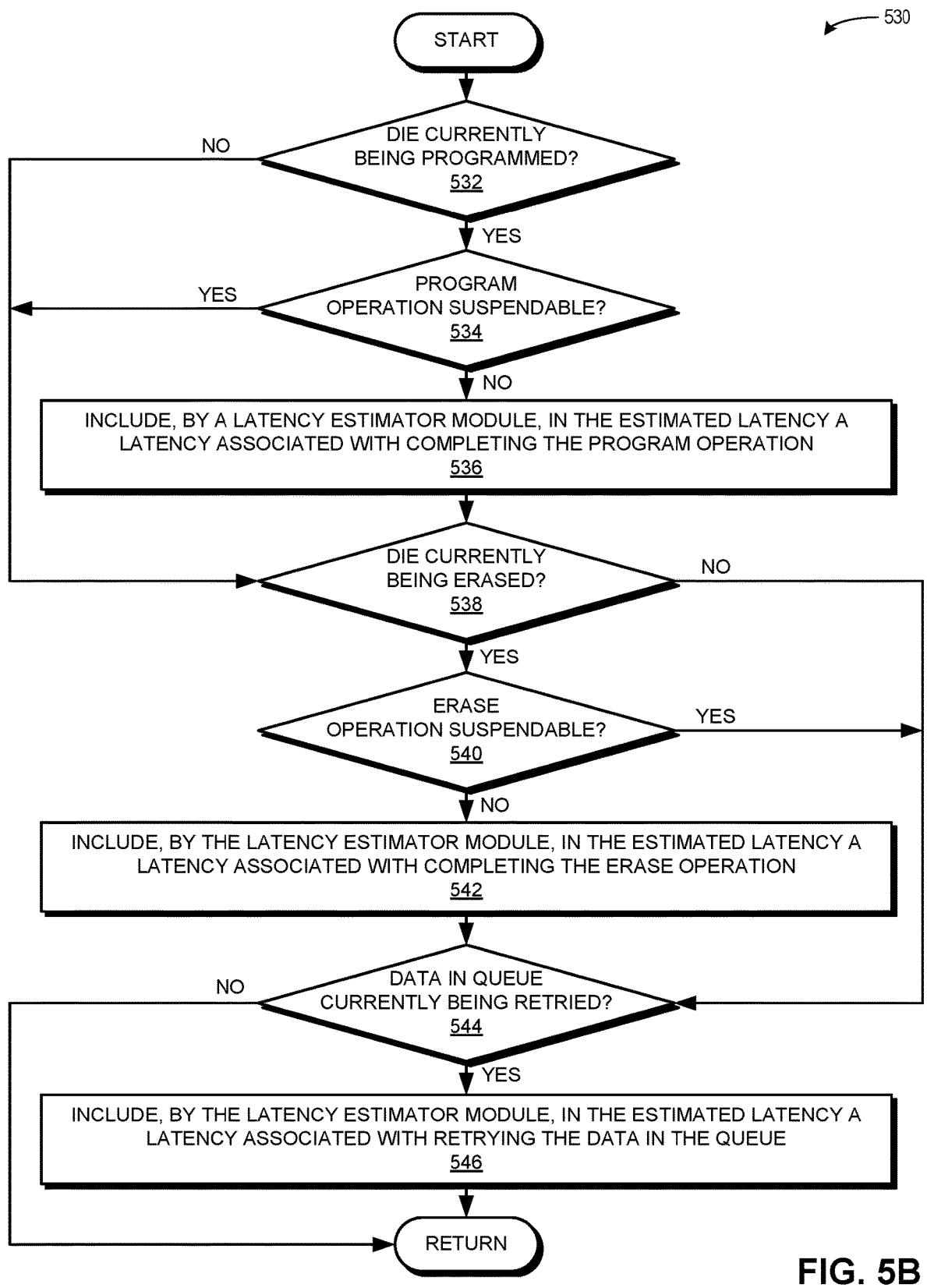
FIG. 5B presents a flowchart illustrating a method for facilitating a user-space storage I/O stack, including estimating a latency associated with an I/O request, in accordance with an embodiment of the present application.

FIG. 5B presents a flowchart 520 illustrating a method for facilitating a user-space storage I/O stack, including estimating a latency associated with an I/O request, in accordance with an embodiment of the present application. Flowchart 520 can correspond to operation 508 of FIG. 5A. During operation, the system determines whether a physical media (e.g., a die) associated with the PBA is currently being programmed (decision 532). If it is, and if the program operation is not suspendable (decision 534), the system includes, by a latency estimator module, in the estimated latency a latency associated with completing the program operation (operation 536). If the die is not currently being programmed (decision 532), or if the die is current being programmed and the program operation is suspendable (decisions 532 and 534), the operation continues at decision 538.

The system determines whether the physical media (e.g., the die) associated with the PBA is currently being erased (decision 538). If it is, and if the erase operation is not suspendable (decision 540), the system includes, by the latency estimator module, in the estimated latency a latency associated with completing the erase operation (operation 542). If the die is not currently being erased (decision 538), or if the die is current being erased and the erase operation is suspendable (decisions 538 and 540), the operation continues at decision 544.

The system determines whether data in a queue of the controller is currently being retried (decision 544). If it is, the system includes, by the latency estimator module, in the estimated latency associated with retrying the data in the queue (operation 546). If there is no data in a queue currently being retried (decision 544), the operation returns.

Exemplary Architecture for Facilitating a User-Space Storage I/O Stack

Figure 6:
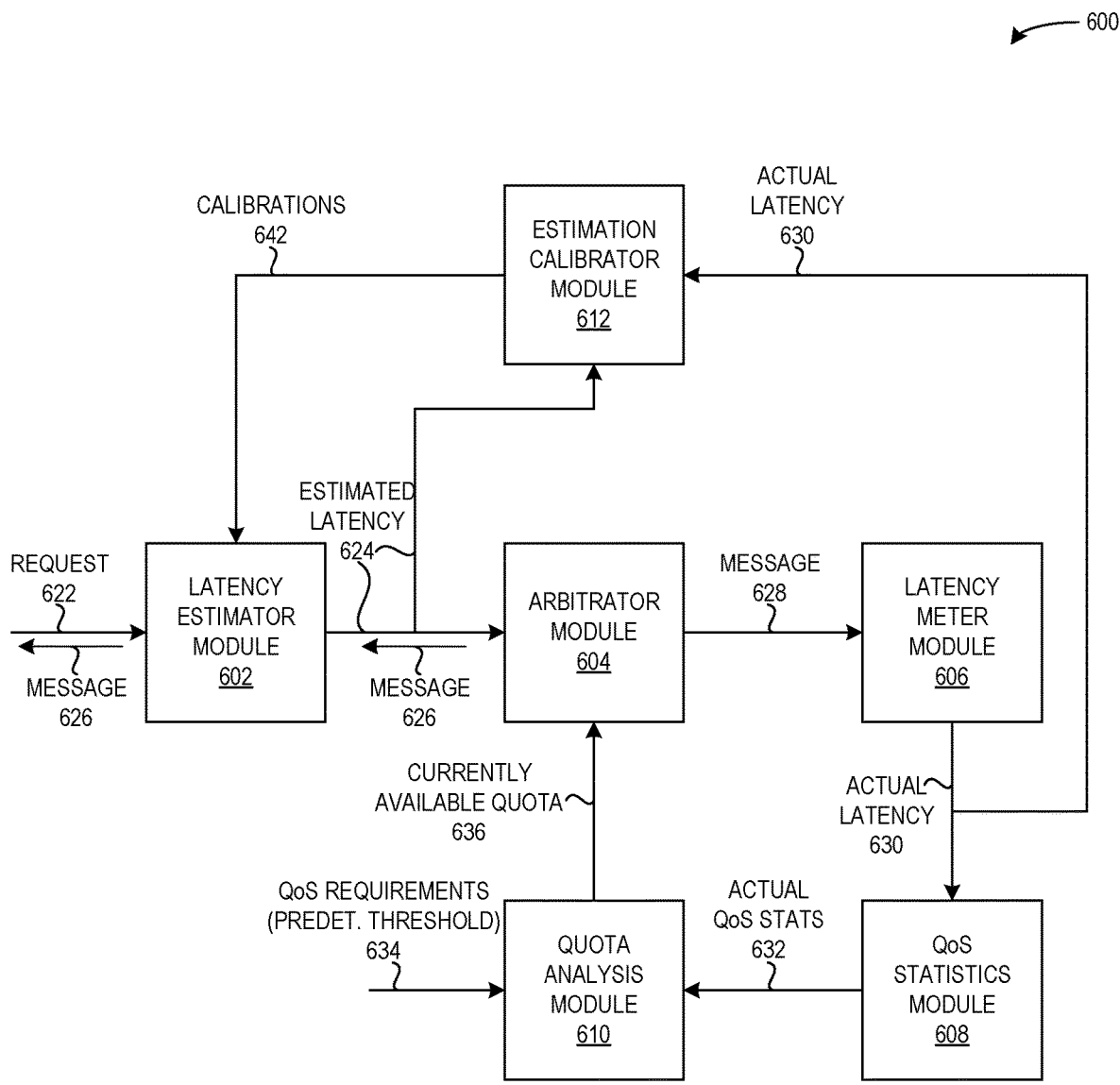
FIG. 6 presents an exemplary architecture for facilitating a user-space storage I/O stack and for facilitating QoS assurance, in accordance with an embodiment of the present application.

FIG. 6 presents an exemplary architecture 600 for facilitating a user-space storage I/O stack and for facilitating QoS assurance, in accordance with an embodiment of the present application. Architecture 600 can include a latency estimator module 602, an arbitrator module 604, a latency meter module 606, a QoS statistics module 608, a quota analysis module 610, and an estimation calibrator module 612. During operation, latency estimator module 602 can receive a request 622, and generate an estimated latency 624 associated with executing the request (as described above in relation to FIG. 5B). Latency estimator module 602 can send estimated latency 624 to both arbitrator module 604 and estimation calibrator module 612. Arbitrator module 604 can determine whether estimated latency 624 exceeds a currently available quota 636, which is received and obtained from quota analysis module 610. If estimated latency 624 exceeds currently available quota 636, arbitrator module 604 can send a message 626 back to the host (via latency estimator module 602). This allows the host to take an action based on whether the I/O (e.g., request 622) request is a read or a write. If the I/O request is a read request, the host can read the requested data from a location other than the PBA, e.g., based on a data recovery technique (as in operation 516 of FIG. 5A). If the I/O request is a write request, the FTL module in the user-space can generate a new PBA, which sends another request (e.g., request 622) into the latency estimate module 602 for another iteration of processing (as in operation 514 of FIG. 5A).

If estimated latency 624 does not exceed currently available quota 636, arbitrator module 604 can issue the I/O request to the assigned PBA, and can further send a message 628 to latency meter module 606, which causes latency meter module 606 to measure an actual latency 630 associated with completing the I/O request. Latency meter module 606 can send actual latency 630 to both estimation calibrator module 612 and QoS statistics module 608.

QoS statistics module can generate actual QoS statistics 632 based on actual latency 630, and send actual QoS statistics 632 to quota analysis module 610. Quota analysis module 610 can compare actual QoS statistics 632 with a predetermined threshold 634 (e.g., QoS requirements as indicated in an SLA), and update a currently available quota 636 based on the comparison. Quota analysis module 610 can send the updated currently available quota 636 to arbitrator module 604 for use in a subsequent determination of whether the estimated latency exceeds the currently available quota.

Estimation calibrator module 612 can receive as input both estimated latency 624 and actual latency 630, and generate calibrations 642. Estimation calibrator module 612 can then send generated calibrations 642 to latency estimator module 602 for use in a subsequent determination of the estimated latency for another I/O request. That is, generated calibrations 642 can indicate modifications that latency estimator module 602 can make to tune a latency estimation operation which is to be performed at a later time by latency estimator module 602.

Note that architecture 600 depicts a closed loop system, which includes feedback loops between output and input elements. For example, one feedback loop exists between latency estimator 602 and estimation calibrator module 612. Another feedback loop exists between latency estimator module 602, arbitrator module 604, latency meter module 606, and estimation calibrator module 612. Yet another feedback loop exists between arbitrator module 604, latency meter module 606, QoS statistics module 608, and quota analysis module 610.

Exemplary Computer System and Apparatus

Figure 7:
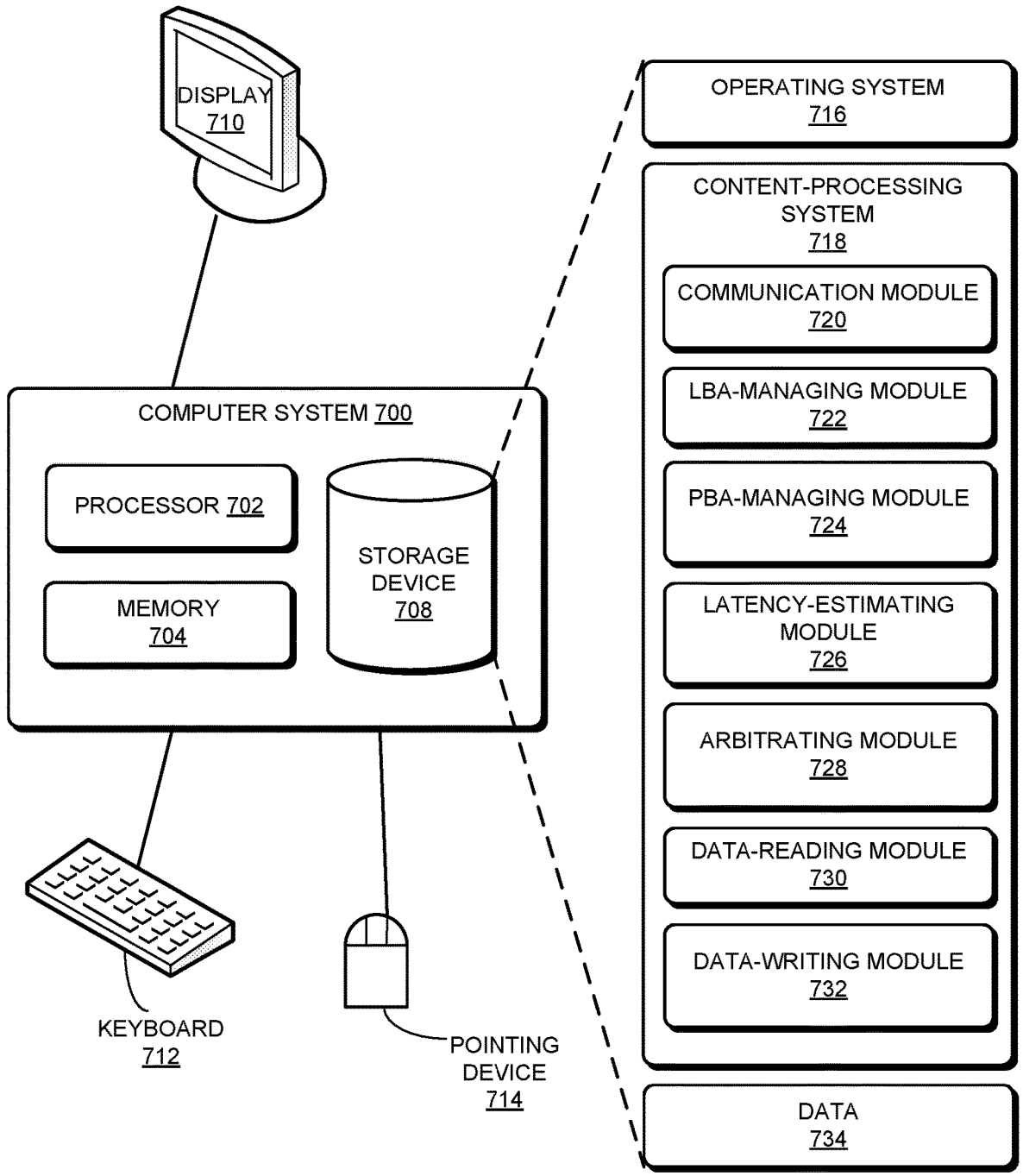
FIG. 7 illustrates an exemplary computer system that facilitates a user-space storage I/O stack, in accordance with an embodiment of the present application.

FIG. 7 illustrates an exemplary computer system 700 that facilitates a user-space storage I/O stack, in accordance with an embodiment of the present application. Computer system 700 includes a processor 702, a memory 704, and a storage device 708. Computer system 700 may be a computing device or a storage device. Memory 704 can include a volatile memory (e.g., RAM) that serves as a managed memory, and can be used to store one or more memory pools. Furthermore, computer system 700 can be coupled to a display device 710, a keyboard 712, and a pointing device 714. Storage device 708 can store an operating system 716, a content-processing system 718, and data 734.

Content-processing system 718 can include instructions, which when executed by computer system 700, can cause computer system 700 to perform methods and/or processes described in this disclosure. For example, content-processing system 718 can include instructions for receiving and transmitting data packets, including a request to write or read data, data to be encoded and stored, or a block or a page of data.

Content-processing system 718 can further include instructions for generating, by a file system in the user-space, a logical block address associated with an I/O request which indicates data to be read or written (LBA-managing module 722). Content-processing system 718 can include instructions for generating, by a flash translation layer module in the user-space, a physical block address corresponding to the logical block address (PBA-managing module 724). Content-processing system 718 can include instructions for estimating a latency associated with executing the I/O request (latency-estimating module 726). Content-processing system 718 can include instructions for, in response to determining that the estimated latency is greater than or equal to a predetermined threshold (arbitrating module 728), and that the I/O request is a read request (arbitrating module 728), reading the requested data from a location other than the physical block address (data-reading module 730).

Content-processing system 718 can include instructions for, in response to determining that the estimated latency is less than the predetermined threshold (arbitrating module 728), and in response to determining that the I/O request is a read request (arbitrating module 728): reading the requested data from the physical block address (data-reading module 730), and sending the read data to a requesting host (communication module 720). Content-processing system 718 can include instructions for, in response to determining that the estimated latency is less than the predetermined threshold (arbitrating module 728), and in response to determining that the I/O request is a write request (arbitrating module 728), writing the requested data to the physical block address (data-writing module 732).

Data 734 can include any data that is required as input or that is generated as output by the methods and/or processes described in this disclosure. Specifically, data 734 can store at least: data to be stored, written, retrieved, or copied; a block of data; a request; an I/O request which indicates data to be read or written; a logical block address (LBA); a physical block address (PBA); a latency; an estimated latency associated with executing an I/O request; an actual latency associated with completing an I/O request; a predetermined threshold; an indicator of physical media associated with a PBA; a status or condition of physical media; raw data; a queue; a program operation; an erase operation; a retry operation; a quota; a currently available quota; a calibration; and a data recovery technique.

Figure 8:
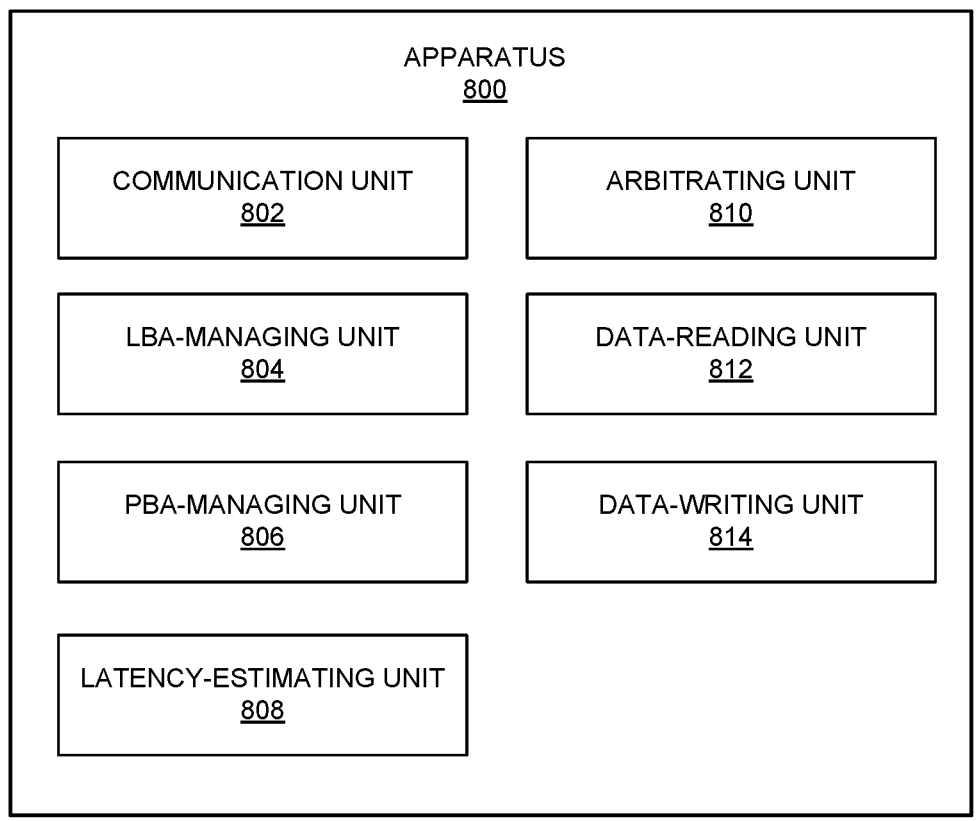
FIG. 8 illustrates an exemplary apparatus that facilitates a user-space storage I/O stack, in accordance with an embodiment of the present application.

FIG. 8 illustrates an exemplary apparatus 800 that facilitates a user-space storage I/O stack, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-814 which perform functions or operations similar to modules 720-732 of computer system 700 of FIG. 7, including: a communication unit 802; an LBA-managing unit 804; a PBA-managing unit 806; a latency-estimating unit 808; an arbitrating unit 810; a data-reading unit 812; and a data-writing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating a user-space storage I/O stack, the method comprising:

generating, by a file system in the user-space, a logical block address associated with an I/O request which indicates data to be read or written;

receiving, by a flash translation layer module in the user-space from the file system, the logical block address, wherein the flash translation layer module operates by communicating with the file system and a block device driver;

mapping, by the flash translation layer module in the user-space, a physical block address corresponding to the logical block address;

notifying the block device driver of the physical block address;

operating, by the block device driver, the mapped physical block address to access or place the data in a non-volatile memory by bypassing a kernel space;

estimating a latency associated with executing the I/O request; and in response to determining that the estimated latency is greater than or equal to a predetermined threshold, and that the I/O request is a read request, reading the requested data from a location other than the physical block address.

2. The method of claim 1, wherein in response to determining that the estimated latency is greater than or equal to the predetermined threshold, and that the I/O request is a write request, the method further comprises:

generating, by the flash translation layer module in the user-space, a new physical block address.

3. The method of claim 1, wherein in response to determining that the estimated latency is less than the predetermined threshold, the method further comprises:

in response to determining that the I/O request is a read request:
reading the requested data from the physical block address; and
sending the read data to a requesting host; and in response to determining that the I/O request is a write request:
writing the requested data to the physical block address.

4. The method of claim 1, wherein determining the estimated latency comprises:

in response to determining that physical media associated with the physical block address is currently undergoing a program operation which is not suspendable, including in the estimated latency a latency associated with completing the program operation;

in response to determining that the physical media associated with the physical block address is currently undergoing an erase operation which is not suspendable, including in the estimated latency a latency associated with completing the erase operation; and in response to determining that raw data in a queue is currently undergoing a retry operation, including in the estimated latency a latency associated with completing the retry operation.

5. The method of claim 1, wherein determining whether the estimated latency is greater than or equal to the predetermined threshold comprises:

determining, by an arbitrator module, whether the estimated latency exceeds or is equal to a currently available quota; and in response to determining that the estimated latency does not exceed the currently available quota:
measuring an actual latency associated with completing the I/O request;

determining actual QoS statistics based on the actual latency; and updating the currently available quota by comparing the actual QoS statistics with the predetermined threshold.

6. The method of claim 5, wherein determining that the estimated latency is greater than or equal to the predetermined threshold is in response to determining that the estimated latency exceeds or is equal to the currently available quota; and wherein in response to determining that the estimated latency does not exceed the currently available quota, the method further comprises:

generating calibrations for subsequent use in determining the estimated latency by comparing the actual latency with the estimated latency, wherein the calibrations are subsequently used by the latency estimator module to determine the estimated latency for another I/O request.

7. The method of claim 1, wherein the block device driver is associated with the user-space.

8. The method of claim 1, wherein mapping, by the flash translation layer module in the user-space, the physical block address corresponding to the logical block address comprises:

optimizing, by the flash translation layer module, the mapping based on a host's visibility into a current status and a historical usage of the physical block address.

9. The method of claim 1, further comprising:

optimizing, by the flash translation layer module, a scheduling of background operations performed by a system comprising the file system, the flash translation layer module, the block device driver, and the non-volatile memory.

10. The method of claim 9, wherein optimizing the scheduling of the background operations further comprises:

in response to determining that the I/O request is a write request, determining that a first drive or a first channel is busy and assigning the write request to a second drive or a second channel with a second load which is lower than a first load of the first drive or the first channel; and in response to determining that the I/O request is a read request, analyzing an estimated latency associated with executing the I/O request based on a status or condition of physical media associated with the non-volatile memory.

11. A computer system for facilitating a user-space storage I/O stack, the system comprising:

a processor; and a memory coupled to the processor and storing instructions, which when executed by the processor cause the processor to perform a method, the method comprising:

generating, by a file system in the user-space, a logical block address associated with an I/O request which indicates data to be read or written;

receiving, by a flash translation layer module in the user-space from the file system, the logical block address, wherein the flash translation layer module operates by communicating with the file system and a block device driver;

mapping, by the flash translation layer module in the user-space, a physical block address corresponding to the logical block address;

notifying the block device driver of the physical block address;

operating, by the block device driver, the mapped physical block address to access or place the data in a non-volatile memory by bypassing a kernel space;

estimating a latency associated with executing the I/O request; and in response to determining that the estimated latency is greater than or equal to a predetermined threshold, and that the I/O request is a read request, reading the requested data from a location other than the physical block address.

12. The computer system of claim 11, wherein in response to determining that the estimated latency is greater than or equal to the predetermined threshold, and that the I/O request is a write request, the method further comprises:

generating, by the flash translation layer module in the user-space, a new physical block address.

13. The computer system of claim 11, wherein in response to determining that the estimated latency is less than the predetermined threshold, the method further comprises:

in response to determining that the I/O request is a read request:

reading the requested data from the physical block address; and sending the read data to a requesting host; and in response to determining that the I/O request is a write request:

writing the requested data to the physical block address.

14. The computer system of claim 11, wherein determining the estimated latency comprises:

in response to determining that physical media associated with the physical block address is currently undergoing a program operation which is not suspendable, including in the estimated latency a latency associated with completing the program operation;

in response to determining that the physical media associated with the physical block address is currently undergoing an erase operation which is not suspendable, including in the estimated latency a latency associated with completing the erase operation; and in response to determining that raw data in a queue is currently undergoing a retry operation, including in the estimated latency a latency associated with completing the retry operation.

15. The computer system of claim 11, wherein determining whether the estimated latency is greater than or equal to the predetermined threshold comprises:

determining, by an arbitrator module, whether the estimated latency exceeds or is equal to a currently available quota; and in response to determining that the estimated latency does not exceed the currently available quota:

measuring an actual latency associated with completing the I/O request;

determining actual QoS statistics based on the actual latency; and updating the currently available quota by comparing the actual QoS statistics with the predetermined threshold.

16. The computer system of claim 15, wherein determining that the estimated latency is greater than or equal to the predetermined threshold is in response to determining that the estimated latency exceeds or is equal to the currently available quota; and wherein in response to determining that the estimated latency does not exceed the currently available quota, the method further comprises:

generating calibrations for subsequent use in determining the estimated latency by comparing the actual latency with the estimated latency, wherein the calibrations are subsequently used by the latency estimator module to determine the estimated latency for another I/O request.

17. The computer system of claim 11, wherein the block device driver is associated with the user-space.

18. The computer system of claim 11, wherein mapping, by the flash translation layer module in the user-space, the physical block address corresponding to the logical block address comprises:

optimizing, by the flash translation layer module, the mapping based on a host's visibility into a current status and a historical usage of the physical block address.

19. The computer system of claim 11, wherein the method further comprises:

optimizing, by the flash translation layer module, a scheduling of background operations performed by a system comprising the file system, the flash translation layer module, the block device driver, and the non-volatile memory.

20. The computer system of claim 19, wherein optimizing the scheduling of the background operations further comprises:

in response to determining that the I/O request is a write request, determining that a first drive or a first channel is busy and assigning the write request to a second drive or a second channel with a second load which is lower than a first load of the first drive or the first channel; and in response to determining that the I/O request is a read request, analyzing an estimated latency associated with executing the I/O request based on a status or condition of physical media associated with the non-volatile memory.

* * * * *